United States Patent [19]

Irle et al.

[11] Patent Number: 6,063,861
[45] Date of Patent: May 16, 2000

[54] SELF CROSSLINKABLE POLYURETHANE-POLYACRYLATE HYBRID DISPERSIONS

[75] Inventors: Christoph Irle, Krefeld; Harald Blum, Leverkusen; Wolfgang Kremer, Kerken; Rolf Roschu, Willich, all of Germany

[73] Assignee: Bayer Aktiengesellschaft, Leverkusen, Germany

[21] Appl. No.: 09/199,676

[22] Filed: Nov. 25, 1998

[30] Foreign Application Priority Data

Dec. 1, 1997 [DE] Germany .................. 197 53 222

[51] Int. Cl.⁷ .................. C08J 3/00; C08K 3/20; C08L 75/00; B32B 27/00; B32B 27/40
[52] U.S. Cl. .................. 524/591; 428/423.1; 428/425.1; 524/507; 524/539; 524/839; 524/840; 525/123; 525/455
[58] Field of Search .................. 524/507, 539, 524/591, 839, 840; 525/123, 455; 428/423.1, 425.1

[56] References Cited

U.S. PATENT DOCUMENTS

| | | | |
|---|---|---|---|
| 3,705,164 | 12/1972 | Honig et al. ........... | 1260/29.6 NR |
| 4,983,662 | 1/1991 | Overbeek et al. ....... | 524/591 |
| 5,371,133 | 12/1994 | Stanley .................. | 524/457 |
| 5,430,107 | 7/1995 | Bederke et al. ......... | 525/300 |
| 5,569,705 | 10/1996 | Vot-Bimbrich et al. .. | 524/591 |
| 5,571,861 | 11/1996 | Klein et al. ............ | 524/591 |
| 5,623,016 | 4/1997 | Klein et al. ............ | 524/591 |
| 5,691,425 | 11/1997 | Klein et al. ............ | 525/455 |

FOREIGN PATENT DOCUMENTS

| | | |
|---|---|---|
| 2073115 | 1/1993 | Canada . |
| 098 752 | 6/1987 | European Pat. Off. . |
| 167 188 | 12/1988 | European Pat. Off. . |
| 308 115 | 3/1989 | European Pat. Off. . |
| 189 945 | 11/1994 | European Pat. Off. . |
| 705 855 | 4/1996 | European Pat. Off. . |

OTHER PUBLICATIONS

Advance in Urethane Science & Technology, vol. 10, (month unavailable) 1987, pp. 121–162.

R. Tennebroek et al, 4th Nurberg Congress, "Creative Advances in Coatings Technology", paper 17, (month unavailable) 1997.

*Primary Examiner*—Patrick D. Niland
*Attorney, Agent, or Firm*—Joseph C. Gil; Thomas W. Roy

[57] ABSTRACT

The present invention relates to storage stable, aqueous polyurethane-polyacrylate hybrid dispersions, which are self crosslinkable at room temperature and contain A) 10 to 95 wt. %, of a polyurethane dispersion, B) 5 to 90 wt. %, of a polymer prepared in the presence of component A) from a mixture of vinyl monomers containing 0.5 to 20 wt. %, based on the total resin solids content of the hybrid dispersion, of a vinyl monomer containing acetoacetoxy groups and C) an at least difunctional primary or secondary amine, which is present in an equivalent ratio of amino groups to acetoacetoxy groups of 0.5:1 to 1.1:1, in which the wt. % of components A) and B) add up to 100, based on the total weight of components A) and B).

The present invention also relates to one-component coating compositions containing these hybrid dispersions as binders and to substrates coated with these coating compositions.

9 Claims, No Drawings

SELF CROSSLINKABLE POLYURETHANE-POLYACRYLATE HYBRID DISPERSIONS

BACKGROUND OF THE INVENTION

1. Field of the Invention

The present invention relates to storage stable, aqueous polyurethane-polyacrylate hybrid dispersions, which are self crosslinkable at room temperature, to their use as binders in storage stable, one-component coating compositions and to coated substrates prepared from these coating compositions.

2. Description of the Prior Art

It is known that aqueous polyurethane dispersions are suitable for the production of adhesives and coatings. In addition to a good chemical resistance, films prepared from polyurethane dispersions are distinguished, above all, by abrasion resistance, toughness and good adhesion to many substrates, e.g., wood, metal and plastics.

Polyurethanes are usually prepared by the isocyanate polyaddition process. Various processes for the preparation of these binders have been summarized, e.g., by D. Dieterich in Prog. Org. Coatings 9, 281 (1981).

It is known to carry out a free radical polymerization of vinyl monomers in the presence of aqueous polyurethane dispersions to modify the properties of the dispersions in a suitable manner as disclosed, e.g., in DE-A 1,953,348 and in EP-A 167,188, 189,945 and 308,115.

It is also known to incorporate terminal or lateral $\alpha,\beta$-olefinically unsaturated double bonds into a polyurethane initially as disclosed, e.g., in EP-A 098,752, 522,419, 522, 420 and 649,865). These polyurethane macromonomers are said to offer the advantage of better bonding to the polyacrylate, which is prepared in the following step by free radical copolymerization. However, it is disclosed in DE-A 1,953,348 that a more or less pronounced grafting also occurs during free radical polymerization in the presence of a polyurethane that does not contain unsaturated groups. It is also disclosed that the high crosslinking density resulting from the use of unsaturated polyurethanes can sometimes be a disadvantage.

To further improve the resistance properties of polyurethane or polyurethane-polyacrylate hybrid dispersions, various possibilities have been proposed for chemically crosslinking the films prepared from these binders. Compared with two-component coating or stoving compositions, one component compositions, which are storage stable and crosslink chemically at room temperature without addition of a crosslinking component, offer advantages because they are easier to use.

It is known to provide polyurethane dispersions with groups that undergo oxidation drying. Films of such dispersions crosslink under the influence of atmospheric oxygen ("Advances in Urethane Science and Technology", vol. 10, p. 121–162 (1987)).

EP-A 332,326 describes mixing polyurethane dispersions containing carbonyl groups with polyacrylate dispersions containing hydrazine functional groups, or polyacrylate dispersions containing carbonyl groups with polyurethane dispersions containing hydrazine functional groups. After film formation, crosslinking takes place by reaction of the carbonyl groups with the hydrazine groups.

EP-A 649,865 discloses a process for the preparation of self-crosslinking polyurethane-polyacrylate hybrid dispersions based on polyurethane macromonomers grafted with acrylate monomers containing carbonyl groups. Polyhydrazides are added to the dispersions as crosslinking agents.

However, self-crosslinking dispersions with crosslinking agents containing hydrazine groups have the disadvantage that they can release small amounts of hydrazine.

Another possibility that has been proposed is the crosslinking of carbonyl groups with polyamines to form enamine or azomethine groups. It has been described that polyurethane-polyacrylate hybrid dispersions, which have carbonyl functional groups and contain the carbonyl groups in the polyurethane part, and polyfunctional amines form a storage stable, self-crosslinking, one-component composition. Crosslinking is controlled by evaporation of the neutralizing amine (R. Tennebroek, J. Geurts, A. Overbeek, A. Harmsen, 4th Nürnberg Congress "Creative Advances in Coatings Technology", paper 17, (1997)).

The preceding compositions do not achieve the known high property level of two-component polyurethane coatings. Accordingly, it is an object of the present invention to improve the crosslinking of one-component compositions such that the properties of the resulting films possess improved properties.

Surprisingly, this object of obtaining improved properties may be achieved with the self-crosslinking polyurethane hybrid dispersions according to the present invention, which contain acetoacetoxy units incorporated in the polyacrylate portion.

SUMMARY OF THE INVENTION

The present invention relates to storage stable, aqueous polyurethane-polyacrylate hybrid dispersions, which are self crosslinkable at room temperature and contain A) 10 to 95 wt. %, of a polyurethane dispersion, B) 5 to 90 wt. %, of a polymer prepared in the presence of component A) from a mixture of vinyl monomers containing 0.5 to 20 wt. %, based on the total resin solids content of the hybrid dispersion, of a vinyl monomer containing acetoacetoxy groups and C) an at least difunctional primary or secondary amine, which is present in an equivalent ratio of amino groups to acetoacetoxy groups of 0.5:1 to 1.1:1, in which the wt. % of components A) and B) add up to 100, based on the total weight of components A) and B).

The present invention also relates to one-component coating compositions containing these hybrid dispersions as binders and to substrates coated with these coating compositions.

DETAILED DESCRIPTION OF THE INVENTION

The polyurethane-polyacrylate dispersions are storage stable and can react at low temperatures, e.g., at room temperature, during and/or after film formation, to form enamines. Components A, B and C are present as a dispersion in water or a mixture of water and a suitable co-solvent.

Because of the introduction of the functional groups into the acrylate part of the polyurethane-polyacrylate hybrid dispersions, it is possible to obtain a high crosslinking density. To retain the high quality properties of the polyurethane which result from the segmented build-up of this polymer even after grafting of the polyacrylate and the crosslinking reaction, it is advantageous to crosslink or graft the polyurethane part chemically to only a minor amount. This is achieved by the hybrid dispersions described in more detail below.

The polyurethane-polyacrylate hybrid dispersions according to the invention contain A) 10 to 95 wt. %, preferably 40 to 90 wt. %, of a polyurethane dispersion, B) 5 to 90 wt. %, preferably 10 to 60 wt. %, of a polymer prepared in the presence of component A) from a mixture of vinyl monomers containing 0.5 to 20 wt. %, based on the total resin solids content of the hybrid dispersion, of a compound containing acetoacetoxy groups, C) an at least difunctional primary or secondary amine, which is present in an equivalent ratio of amino groups to acetoacetoxy groups of 0.5:1 to 1.1:1, preferably 0.5:1 to 1:1.

The wt. % of components A) and B) preferably add up to 100, based on the weight of components A) and B).

Suitable polyurethane dispersions for the preparation of the polyurethane-poly-acrylate hybrid dispersions are known. The polyurethane dispersions are based on reaction product of A1) polyisocyanates, preferably in an amount of 30 to 75 wt. %, A2) polymeric polyols having number average molecular weights of 400 to 6,000, preferably in an amount of 20 to 70 wt. %, A3) optionally monoalcohols, preferably in an amount of 0 to 10 wt. %, and A4) polyols, aminopolyols or polyamines having a number average molecular weight of less than 400, preferably in an amount of 30 to 75 wt. %, wherein at least one of these compounds contains an ionic group or a group capable of forming an ionic group.

The wt. % of components A1), A2), A3) and A4) preferably add up to 100, based on the total weight of components A1), A2), A3) and A4).

The ionic groups can be cationic or anionic, preferably anionic. The groups capable of forming an ionic group are groups incorporated into the polyurethane, e.g., free carboxyl groups, that can be converted into ionic groups by neutralization.

Suitable polyisocyanates A1 include diisocyanates corresponding to the formula

wherein

R$_1$ represents an aliphatic hydrocarbon radical having 4 to 12 carbons atoms, a cycloaliphatic hydrocarbon radical having 6 to 15 carbon atoms, an aromatic hydrocarbon radical having 6 to 15 carbon atoms or an araliphatic hydrocarbon radical having 7 to 15 carbon atoms.

Preferred examples of these diisocyanates include tetramethylene diisocyanate, hexamethylene diisocyanate, 4,4'-diisocyanato-diphenylmethane, 2,4'-diisocyanato-diphenylmethane, 2,4-diisocyanato-toluene, 2,6-diisocyanatotoluene, α,α,α',α'-tetramethyl-m- or -p-xylylene diisocyanate and mixtures of these diisocyanates. Particularly preferred diisocyanates include 1-isocyanato-3,3,5-trimethyl-5-isocyanatomethylcyclohexane (isophorone diisocyanate) and 4,4'-diisocyanato-dicyclo-hexylmethane.

Also suitable as polyisocyanates A1) are polyisocyanates containing, e.g., isocyanurate, biuret, uretdione or carbodiimide groups. These polyisocyanates can have higher functionalities of more than 3.

The polymeric polyols A2) are selected from the known polyols from polyurethane chemistry, which have a number average molecular weight of 400 to 6,000, preferably 600 to 2,500, and an OH functionality of 1.8 to about 4, preferably 2 to 3. Examples include polyesters, polyethers, polycarbonates, polyester-carbonates, polyacetals, polyolefins and polysiloxanes.

Polyols, aminopolyols or polyamines A4) having a molecular weight of less than 400, which can be used as chain lengtheners in polyurethanes or polyurethane dispersions, are also known from polyurethane chemistry. Examples include ethanediol, 1,4-butanediol, cyclohexanedimethanol, trimethylolpropane, glycerol, ethylenediamine, 1,4-diaminobutane, isophoronediamine and 4,4-diaminodicyclohexyl-methane.

Suitable low molecular weight polyols, which are capable of formation of an ionic group, include dimethylolpropionic acid and N-methyldiethanolamine.

Optional monoalcohols A3), which may also be incorporated into the polyurethane, include polyoxyalkylene ethers having a number average molecular weight of 250 to about 3,000 and containing at least one OH group per molecule. These compounds are prepared by the alkoxylation of an alcohol with ethylene oxide and optionally propylene oxide. These ethers are hydrophilic and improve the dispersion of the polyurethane in water.

In addition to the use of difunctional OH components, termination of the polyurethane prepolymer with monofunctional alcohols is also possible. Suitable monoalcohols include those with polymerizable functional groups, e.g., hydroxy-functional (meth)acrylic acid esters.

In a preferred embodiment for the preparation of self-crosslinking polyurethane-polyacrylate hybrid dispersions, the isocyanate groups are completely chain lengthened without termination with a saturated or unsaturated monoalcohol component.

The aqueous PUR dispersions are prepared in known manner. The polyisocyanate component is reacted with the polymeric polyol and low molecular weight chain extenders to provide a polyurethane. The preparation may optionally take place in a solvent, which may optionally be separated after completion of the reaction.

In a further step, the groups which are capable of neutralization are then converted into their salt form and the dispersion is formed by mixing the polyurethane with water. Any residual NCO groups still present are chain-lengthened after or during the dispersing step. The NCO groups react with water or with chain lengtheners (e.g., polyamines) added to the dispersion. If a low-boiling solvent is used, it can be separated by distillation and recovered.

The dispersion can be obtained in a very finely divided form, depending upon the degree of neutralization, so that it has the appearance of a solution. The dispersion can be present in the form of very coarsely divided form, which may also remain stable. The solids content can also be varied between 20 and 50 wt. %.

After preparation of the polyurethane dispersion, the polymerization of the vinyl monomers takes place in the next step. These monomers contain at least one component which can be polymerized by free radicals and contains acetoacetoxy groups, e.g., acetoacetoxyethyl acrylate or, preferably, acetoacetoxyethyl methacrylate. Other monomers which do not contain acetoacetoxy groups can also be employed. Examples include styrene, (meth)acrylic acid esters having 1 to 12 carbon atoms in the alcohol radical (such as methyl methacrylate, butyl methacrylate, ethyl acrylate, butyl acrylate and 2-ethylhexyl acrylate), di(meth) acrylic acid esters of diols (such as ethylene glycol, 1,4-butanediol and 1,6-hexanediol), (meth)acrylamide, (meth) acrylonitrile, and vinyl esters of aliphatic carboxylic acids having 2 or more carbon atoms (such as vinyl acetate or versatic acid vinyl ester).

While monomers having hydroxyl or acid groups, e.g., hydroxyethyl (meth)acrylate or (meth)acrylic acid, may be used; preferably, no monomers with acid functional groups are included in the polymerization. The amount of polymerizable monomers is 5 to 90 wt. %, preferably 10 to 60 wt. %, based on the total resin solids content of the polyurethane-polyacrylate hybrid dispersion.

The polymerization is preferably carried out by aqueous emulsion polymerization. An emulsion copolymerization, initiated by free radical initiators, of the unsaturated monomers is carried out in the presence of the polyurethane dispersion. The emulsion polymerization can either be carried out 1) by initially introducing the polyurethane dispersion and, optionally, a surface-active substance into the polymerization vessel and then metering in the monomers and the initiator separately over a certain period of time, e.g., 0.5 to 6 hours, or 2) by initially introducing some of the polyurethane dispersion into the polymerization vessel and metering in the remainder, together with the monomers and the initiator, in separate streams over a period of time of, e.g., 0.5 to 6 h.

However, a procedure can also be followed in which the polyurethane dispersion, monomers and initiator are metered separately and continuously into the polymerization vessel over the entire period of time and only at least of a portion of water is initially introduced. This method of polymerization is also suitable for carrying out a batch procedure in which the polyurethane dispersion, monomer mixture and initiator are initially introduced together into the polymerization vessel, heated up to the desired polymerization temperature and kept at this temperature for 2 to 10 hours.

Suitable initiators include potassium persulfate, ammonium persulfate, organic peroxides, organic hydroperoxides, hydrogen peroxide and, preferably, redox systems. Particularly preferred examples are redox systems of water-soluble, non-ionic peroxides that supply free radicals, such as t-butyl hydroperoxide the oxidation component and formaldehydesulfoxylate or ascorbic acid as the reduction component, and catalytic amounts of an iron(II) salt.

The emulsion polymerization is in general carried out at a temperature of 20° C. to 100° C., preferably 40° C. to 65° C.

When the polymerization reaction is complete, a finely divided aqueous polymer emulsion is obtained having an average particle diameter, measured by laser correlation spectroscopy, of 15 to 200 nm, preferably 30 to 100 nm.

In addition to homo- and/or copolymers of the monomers or monomer mixtures employed for the polymerization, the dispersion also comprises contents of grafted polymerization products of the monomers onto the polymer chains of the polyurethane as the graft base. Such grafting reactions, which are induced by transfer reactions by the emulsifier, are known and described, e.g., by Fortschritte der Hochpolymer-Forschung 1, 300 (1959), DE-A 1,953,348.

The resulting polyurethane-polyacrylate hybrid dispersion contains acid functional groups and acetoacetoxy functional groups. The acetoacetoxy groups incorporated are incorporated exclusively into the polyacrylate portion, while the acid groups are preferably incorporated into the polyurethane portion.

When the copolymerization has ended, a polyamine or a mixture of various polyamines, which are preferably dissolved in water for easier incorporation, is added to the dispersion. Suitable polyamines include all compounds having more than one amino group, preferably polyamines having a number average molecular weight of less than 1000, more preferably diprimary aliphatic amines, such as ethylenediamine, hexamethylenediamine and isophoronediamine, or compounds which contain both primary and secondary amino groups, such as diethylenetriamine or triethylenetetramine.

Alternatively, the polyamine or the mixture of various polyamines can be employed for neutralization of the polyurethane prepolymer. This means, however, that the prepolymer should no longer contain isocyanate functional groups during the neutralization. In accordance with this embodiment, chain lengthening should take place before the dispersing the polyurethane in water.

If the chain lengthening of the polyurethane dispersion is carried out in water, under certain circumstances the polyurethane-polyacrylate hybrid dispersions according to the invention have a high pH, because of the presence both of the neutralizing amine and the crosslinking polyamine. However, it is often desirable to establish the lowest possible pH, e.g. a pH of 7 to 8.5. If the neutralizing amine is more volatile than the crosslinking amine, it is possible to subsequently remove the neutralizing amine from the system (e.g., by distillation), without a decrease in properties or storage stability.

The polyurethane-polyacrylate hybrid dispersions according to the invention can be employed as binders in coating compositions, which crosslink at low temperatures, e.g., at ambient temperature. The polyurethane-polyacrylate hybrid dispersions are preferably employed as binders in compositions for coating wood and plastics.

The invention is further illustrated but is not intended to be limited by the following examples in which all parts and percentages are by weight unless otherwise specified.

EXAMPLES

| Abbreviations used: | |
| --- | --- |
| PUD: | Polyurethane dispersion |
| MMA: | Methyl methacrylate |
| BMA: | Butyl methacrylate |
| AAEM: | Acetoacetoxyethyl methacrylate |
| DETA: | Diethylenetriamine |
| APS: | Average particle size |
| SC: | Solids content |

Polyurethane dispersion A1:

690 g of poly(tetrahydroftiran) diol having a number average molecular weight of 1,000, 98 g of cyclohexanedimethanol, 139 g of dimethylolpropionic acid and 383 g of N-methylpyrrolidone were initially introduced into a 4 liter three-necked flask equipped with a reflux condenser, internal thermometer and stirrer. A clear solution was prepared by heating to 70° C. 977 g of bis-(4-isocyanatocyclohexane)-4 heated to 100° C. It was stirred at this temperature until the isocyanate content of the prepolymer solution was 4.8 %. It was then cooled to 50° C. and 105 g of triethylamine were added.

2,508 g of deionized water were initially introduced into a second 4 liter three-necked flask with an internal thermometer and stirrer. The water was heated to 40° C. and 2,087 g of the prepolymer solution were added with stirring over a period of 15 min. The mixture was subsequently stirred at 40–50° C. for 10 min, and a solution of 48 g of ethylenediamine in 277 g of water was then added over a period of 30 min.

Polyurethane dispersion A2:

The procedure described under A1 was repeated with the exception that the poly(tetrahydrofuran) diol was replaced by a polyester-carbonate diol having a number average MW of 1,000.

Polyurethane dispersion A3:

The procedure described under A1 was repeated with the exception that the poly(tetrahydrofuran) diol was replaced by a polyester-diol prepared from adipic acid and diethylene glycol and having a number average MW of 1,000.

Polyurethane-polyacrylate hybrid dispersion B1:

412 g of polyurethane dispersion A1, 142 g of water, 0.7 g of a 0.9% solution of iron(II) sulfate in water and 0.7 g of a 0.9% solution of EDTA (Ethylenediamine-tetraacetic acid) in water were introduced into a 1 liter four-necked flask equipped with a reflux condenser, internal thermometer and stirrer, and heated to 50° C.

In each case 25% of solutions I, II and III (set forth below) were added with stirring over a period of 5 min. A slight exotherm indicates the start of the polymerization reaction. The reaction mixture was stirred at 50° C. for 30 min and the remaining 75% of solutions I, II and III were metered in parallel over a period of 1 h. The mixture was allowed to react for an additional 1 h and was then cooled to 25° C. After cooling a solution of 3 g of diethylenetriamine (25% in water) was added dropwise over a period of 15 min. After a further 30 min, the mixture was filtered (filter T 5500, Seitz).

The dispersion had the following properties:

| | APS | 64 nm (laser correlation spectroscopy) |
|---|---|---|
| | SC | 35.3% |
| | pH | 9.8 |
| Solution I: | | 94 g of MMA, 37 g of BMA, 19 g of AAEM |
| Solution II: | | 0.7 g of Na formaldehydesulfoxylate dissolved in 67 g of water |
| Solution III: | | 1.5 g of t-butyl hydroperoxide (70% in water), dissolved in 75 g of water |

Polyurethane-polyacrylate hybrid dispersions B2–B7:

Polyurethane-polyacrylate hybrid dispersions B2–B7 were prepared by a procedure analogous to that described above using the following compositions:

| Weight/g | B2 | B3 | B4 | B5 | B6 | B7[1) |
|---|---|---|---|---|---|---|
| PUD A1 | 412 | 412 | — | — | 135 | 412 |
| PUD A2 | — | — | 412 | — | — | — |
| PUD A3 | — | — | — | 412 | — | — |
| MMA | 100 | 87 | 94 | 94 | 148 | 94 |
| BMA | 40 | 35 | 38 | 38 | 148 | 38 |
| AAEM | 9 | 28 | 19 | 19 | 108 | 19 |
| DETA | 1.5 | 4.5 | 3.0 | 3.0 | 17.3 | 3.0 |
| APS/mm | 64 | 71 | 35 | 105 | 95 | 69 |
| SC/% | 35.3 | 35.4 | 36.2 | 35.8 | 33.6 | 37.0 |
| pH | 9.8 | 10.2 | 10.1 | 10.3 | 10.9 | 8.4 |

[1)]After addition of the diethylenetriamine solution, nitrogen was passed through the dispersion, which was heated at 50° C., for 8 h in order to remove the triethylamine.

Clear coating compositions were formulated by adding the following ingredients to 100 parts of dispersions B1–B7.

| Cosolvent: | N-Methylpyrrolidone (11 parts by wt.: B6: 12.5 parts), Butylglycol/water 1:1 (10 parts by wt.) |
|---|---|
| Defoamer: | Tego Foamex 805 (Tego Chemie), delivery form (0.2 parts by wt.) |
| Wetting agent: | Byk 346 (Byk Chemie), delivery form (0.5 parts by wt.) |
| Thickener: | Acrysol RM8, (Rohm & Haas) 5% in water (1.0 parts by wt.) |

To determine the film hardness (pendulum damping in accordance with DIN 53 157) the coating compositions were applied to glass plates at a wet film thickness of 200 μm. To determine the resistance to water, ethanol (50% aqueous solution) and acetone, the clear coating compositions were applied to oak panels in 3 layers (in each case 100 g of coating/m²), which were then subjected to forced drying in each case for 30 min at 50° C. Before application of the 2nd and 3rd layer, the paint surface was sanded slightly. Resistances were determined by the following method: 7 days after preparation cotton wool pads impregnated with the solvent were placed on the coatings and covered with Petri dishes. After 24 hours (water), 5 minutes (ethanol) or 10 seconds (acetone), the wetted films were dried carefully with household paper and an evaluation was made. The softening, clouding, loss of adhesion and undermigration were determined on a scale of 0 to 4:

| | Softening | Clouding | Loss of Adhesion | Under-migration |
|---|---|---|---|---|
| 0 | Unchanged | unchanged, clear | Unchanged | unchanged |
| 1 | very slight | haze | difficult to scratch off | tiny bubbles |
| 2 | Somewhat more | cloudy | can be scratched off | bubbles |
| 3 | easy to damage with the fingernail | very cloudy | easy to scratch off | many bubbles |
| 4 | can be wiped off | milky | film dissolves when dabbed | accumulation of liquid |

The following test results demonstrate the high water and solvent resistance of coatings prepared from the dispersions according to the invention:

| Pendulum damping/s (DIN 53 157) | B1 | B2 | B3 | B4 | B5 | B6 | B7 |
|---|---|---|---|---|---|---|---|
| after 1 hour | 29 | 17 | 29 | 21 | 31 | 34 | 21 |
| after 1 day | 91 | 49 | 84 | 49 | 95 | 74 | 62 |
| after 7 days | 144 | 132 | 141 | 127 | 126 | 133 | 137 |
| Solvent resistances | | | | | | | |
| Water (24h) | 0200 | 0100 | 0100 | 0000 | 1000 | 0110 | 0100 |
| Ethanol (5') | 0000 | 2000 | 0000 | 0000 | 2010 | 2000 | 2000 |
| Acetone (10") | 1000 | 0000 | 1000 | 1000 | 1100 | 1000 | 1000 |

Although the invention has been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:

1. A storage stable, aqueous polyurethane-polyacrylate hybrid dispersion, which is self crosslinkable at room temperature and comprises A) 10 to 95 wt. %, based on the total resin solids content of the hybrid dispersion, of a polyurethane dispersion, B) 5 to 90 wt. %, based on the total resin solids content of the hybrid dispersion, of a polymer prepared in the presence of component A) from a mixture of vinyl monomers containing 0.5 to 20 wt. %, based on the total resin solids content of the hybrid dispersion, of a vinyl monomer containing acetoacetoxy groups and C) an at least difunctional primary or secondary amine having a number average molecular weight of less than 1,000, which is present in an equivalent ratio of amino groups to acetoacetoxy groups of 0.5:1 to 1.1:1, in which the wt. % of components A) and B) add up to 100, based on the total weight of components A) and B).

2. The hybrid dispersion of claim 1 which comprises

A) 40–90 wt. %, based on the total resin solids content of the hybrid dispersion, of a polyurethane dispersion, wherein the polyurethane is the reaction product of A1) 30 to 75 wt. % of a polyisocyanate, A2) 20 to 70 wt. % of a polymeric polyol having a number average molecular weight of 400 to 6,000

A3) 0 to 10 wt. % of a monoalcohol and

A4) 2 to 20 wt. % of a polyol, aminopolyol or polyamine having a number average molecular weight of less than 400, wherein at least one compound contains an ionic group or a group capable of forming an ionic group, B) 10 to 60 wt. %, based on the total resin solids content of the hybrid dispersion, of a polymer prepared in the presence of component A) from a mixture of vinyl monomers containing 0.5 to 20 wt. %, based on the total resin solids content of the hybrid dispersion, of a vinyl monomer containing acetoacetoxy groups and C) an at least difunctional primary or secondary amine having a number average molecular weight of less than 1,000, which is present in an equivalent ratio of amino groups to acetoacetoxy groups of 0.5:1 to 1.1:1.

3. The polyurethane-polyacrylate hybrid dispersion of claim 2 wherein the polyisocyanate component A1 comprises 1-isocyanato-3,3,5-trimethyl-5-isocyanatomethyl-cyclohexane.

4. The polyurethane-polyacrylate hybrid dispersion of claim 2 wherein polyisocyanate component A1 comprises 4,4'-diisocyanato-dicyclohexylmethane.

5. The polyurethane-polyacrylate hybrid dispersion of claim 1 wherein said compound containing acetoacetoxy groups comprises acetoacetoxyethyl methacrylate.

6. The polyurethane-polyacrylate hybrid dispersion of claim 1 wherein said at least difunctional primary or secondary amine is water soluble.

7. The polyurethane-polyacrylate hybrid dispersion of claim 2 wherein monoalcohol component A3) does not contain double bonds that can be polymerized by free radicals.

8. A binder-containing coating composition containing the polyurethane-polyacrylate hybrid dispersion of claim 1 as the binder.

9. A wood substrate coated with the binder-containing coating composition of claim 8.

* * * * *